(12) United States Patent
Dunshea et al.

(10) Patent No.: US 7,552,303 B2
(45) Date of Patent: Jun. 23, 2009

(54) MEMORY PACING

(75) Inventors: Andrew Dunshea, Austin, TX (US); Jos Manuel Aecapadi, Austin, TX (US); Catherine Moriarty Nunez, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 11/011,243

(22) Filed: Dec. 14, 2004

(65) Prior Publication Data

US 2006/0129780 A1 Jun. 15, 2006

(51) Int. Cl.
*G06F 12/00* (2006.01)

(52) U.S. Cl. ............... 711/170; 711/100; 711/167; 707/206

(58) Field of Classification Search ............ 710/58; 711/1, 105, 150, 163, 167, 170, 206; 712/214; 718/1, 100

See application file for complete search history.

(56) References Cited

U.S. PATENT DOCUMENTS

| | | | | |
|---|---|---|---|---|
| 5,463,776 A | * | 10/1995 | Voigt et al. | 707/101 |
| 5,566,315 A | * | 10/1996 | Milillo et al. | 711/113 |
| 5,926,834 A | * | 7/1999 | Carlson et al. | 711/152 |
| 6,038,571 A | * | 3/2000 | Numajiri et al. | 707/206 |
| 6,349,314 B1 | * | 2/2002 | Patel | 707/206 |
| 6,408,371 B1 | * | 6/2002 | Jeddeloh | 711/170 |
| 6,442,706 B1 | * | 8/2002 | Wahl et al. | 714/6 |
| 6,598,142 B2 | | 7/2003 | Paavilainen et al. | |
| 7,000,088 B1 | * | 2/2006 | Rudeseal et al. | 711/173 |
| 7,127,568 B2 | * | 10/2006 | Watanabe et al. | 711/154 |
| 2004/0042476 A1 | * | 3/2004 | Peacock | 370/412 |
| 2004/0255295 A1 | * | 12/2004 | Stackhouse et al. | 718/100 |

FOREIGN PATENT DOCUMENTS

WO WO03/042839 5/2003

OTHER PUBLICATIONS

"Flow Control", Webopedia, Jun. 20, 2003, http://web.archive.org/web/20030620113804/http://www.webopedia.com/TERM/F/flow_control.html.*

(Continued)

*Primary Examiner*—Kevin L Ellis
*Assistant Examiner*—Kalpit Parikh
(74) *Attorney, Agent, or Firm*—Yee & Associates, P.C.; Matthew W. Baca

(57) ABSTRACT

A method, system, and program for managing memory page requests in a multi-processor data processing system determines a threshold value of available memory, and dynamically adjusts an allocation time to fulfill a page request if the available memory is below a threshold value. The allocation time to fulfill the page request is based upon a percentage of available memory pages once a page stealer commences a scan for pages. An allocation wait time is inversely proportionally adjusted depending upon the percentage of available memory. The allocation wait time has a duration that increases in time as the percentage of available memory decreases and decreases in time as the percentage of available memory increases. More specifically, an average time per page to allocate a page including a scan time for the scan in computing the average time is determined. Then a tunable value is applied to the average time to determine a wait time. In a preferred embodiment, user defined values are received that would control the allocation wait time before fulfilling a page request.

3 Claims, 4 Drawing Sheets

OTHER PUBLICATIONS

"AIX Versions 3.2 and 4 Performance Tuning Guide: Use of Disk I/O Pacing", Dec. 9, 2003,IBM, http://web.archive.org/web/20031209224523/http://www.unet.univie.ac.at/aix/aixbman/prftungd/diskpace.htm.*

Mauro, Jim, "The Solaris Process Modle: The System Clock Handler", Dec. 12, 2003, Sun Microsystems, http://web.archive.org/web/20031212173554/http://developers.sun.com/solaris/articles/THREADexec/index.html.*

Nilsen, K., Schmidt, W., 1994. A high-performance hardware-assisted real-time garbage collection sytem. Journal of Programming Languages, January, pp. 1-40.*

Accapadi et al., "System and Method for Dynamically Adjusting Read Ahead Values Based Upon Memory Usage", US Utility Patent Application, Filed Apr. 20, 2004, 40 pages.

"Pacing System for ROS Controlled Machines", IBM Technical Disclosure Bulletin, Jan. 1977, pp. 2877-2878.

"Direct memory Access TAG Architecture", IBM Technical Disclosure Bulletin, Sep. 1989, pp. 143-151.

* cited by examiner

| FREE MEMORY FRAMES 601 | % BELOW THRSHOLD 602 | WEIGHT MULTIPLIER % BELOW THRESHOLD X 0.1 + 1  603 | AVG STEAL TIME X STEAL WEIGHT 1US X 0.5 (50%) 604 | CALCULATED DELAY WEIGHT MULTIPLIER X STEAL WEIGHT 605 |
|---|---|---|---|---|
| 100 | 0 | 0 X 0.1 + 1 = 1 | 1 | 1 X 1 = 1US |
| 90 | 10 | 10 X 0.1 + 1 = 2 | 1 | 2 X 1 = 2US |
| 80 | 20 | 20 X 0.1 + 1 = 3 | 1 | 3 X 1 = 3US |
| 70 | 30 | 30 X 0.1 + 1 = 4 | 1 | 4 X 1 = 4US |
| 60 | 40 | 40 X 0.1 + 1 = 5 | 1 | 5 X 1 = 5US |
| 50 | 50 | 50 X 0.1 + 1 = 6 | 1 | 6 X 1 = 6US |
| 40 | 60 | 60 X 0.1 + 1 = 7 | 1 | 7 X 1 = 7US |
| 30 | 70 | 70 X 0.1 + 1 = 8 | 1 | 8 X 1 = 8US |
| 20 | 80 | 80 X 0.1 + 1 = 9 | 1 | 9 X 1 = 9US |

MEMORY PACING

BACKGROUND OF THE INVENTION

1. Technical Field

The field of this invention is data processing, or more specifically, methods, systems, and products for managing virtual memory in a multi-processor computer.

2. Description of the Related Art

In a computer system Random Access Memory (RAM) contains the instructions (program) to execute and the data necessary to execute those instructions. The resulting data from execution of the program code is also stored back into the RAM.

Modem computer systems use Virtual Memory Management (VMM) with on demand paging to extend the size of memory. Modem computer systems can do this as only the actual instructions and data required at a given point in time for execution need to reside in memory.

For efficiency, real memory is divided into units, often of equal sizes. These units are referred to herein as pages or frames. When a portion of a program's code or data is needed in RAM, it will be bought in one page at a time. Equally, when a portion of a program or data is no longer needed in RAM it will be removed from the RAM a page at a time to make room for other instructions or data.

The VMM manages the translation between the effective size of memory (effective memory address range) and the physical size of memory (physical memory address range). The VMM maintains a map, which is used to translate the effective address of a page to the physical location of that page in RAM. This is known as a page translation, and the entries in this map are called Page Translation Entries (PTE). When an effective memory address is accessed which is not in physical memory a page fault occurs. To satisfy the page fault and allow execution to continue, a page in memory will be selected for replacement if there are no free pages in memory.

The VMM is responsible for selecting the page to replace, removing the contents of that page out of RAM, removing the PTE, loading the new page into memory, and adding a PTE. Once this has been done execution of the faulting program is free to continue.

The VMM can use a variety of page replacement policy considerations when selecting pages in memory to be replaced with newly requested data including how recently the page was last accessed, and the number of times it has been bought back into memory (repaged). The most common method employed in modern computer systems is some variant of a Least Recently Used (LRU) algorithm. Other considerations or policies are often tied into the LRU policy to weight the decision to remove a page either more or less favored against other potential candidates. In some cases many pages will need to be examined in RAM before a suitable candidate can be found.

Finding a suitable candidate page in memory to replace can be a lengthy process. In addition, removal of a page from memory can be a lengthy process as the contents of the page being removed will need to be save to physical storage if it's contents have been changed since being loaded into the RAM.

For efficiency, the VMM always tries to keep free pages available in RAM. If free pages are available in RAM the page fault takes less time to satisfy as the VMM does not need to find a suitable candidate in memory to replace, nor does it need to save the contents of the page if changes have occurred to the page since being bought into RAM. For efficiency, pages which are available for immediate replacement (unallocated) are entered into a freelist. When the VMM needs to satisfy a page request it first checks for a free page on this list.

In order to increase the chances that there will be free page on the free list when a page fault occurs, RAM is scanned and ideal candidates selected and removed from RAM prior to being needed. This is done by maintaining a count of the number of available free pages. If the number of free pages available drops below a predetermined and often tunable value, a scan of RAM using the VMM's page replacement policy is initiated to look for suitable pages to free and add to the freelist. When the frequency of page faults exceed the ability of the VMM to keep pages available on the freelist page faults must then wait to have their page fault satisfied until the VMM is able to free a page. Once pages become available, threads waiting on pages compete for page allocations. Some may get all the pages needed, while others may get only some or none of the pages requested. In the case that the thread only gets some of the needed pages, this can lead to fragmentation of follow-on requests such as I/O operations done in multiple smaller blocks instead of one larger operation. In addition, a thread with only a portion of it's required pages may remain blocked, thereby holding pages which could have been used to make further progress by another competing thread.

Other known strategies for dealing with these problems are to regionalize memory. For example, only certain types of memory requests (for example requests for file pages) are allowed to utilize a percentage of memory. This however can cause memory request to fail and therefore wait even when there are free memory pages available. It also drives up the scan to free ratio as the number of candidate pages decreases (i.e. if only 20% of memory is allocated for file pages and a scan for file pages is commenced, statistically only one in 5 pages inspected will be of the right type).

SUMMARY OF THE INVENTION

Methods, systems, and computer program products are provided for memory pacing. Embodiments include dynamically adjusting the allocation time to fulfill a page request based on the percentage of available memory frames once the page stealer has commenced a scan for pages. The allocation wait time is introduced into the page allocation algorithm, and is inversely proportionally adjusted depending of the percentage of free memory. A typical embodiment is to introduce a predetermined wait time once the page stealer begins a scan for stealable pages. The wait time is increased (for example doubled) as the percentage of available memory continues to fall, (for example doubled every time ten percent of the currently available frames are allocated below the point at which the page stealer commenced it's scan). Conversely, as the number of available pages increases the amount of wait time is reduced using the same concept.

Many embodiments of this invention include allowing user defined values to control the initial wait time when the page stealer begins scanning for stealable pages, and the rate at which the wait time will be adjusted, including not adjusting the wait time. Many embodiments also include a dynamic adjustment of these values based on learned behavior, for example increasing the rate at which the wait time is adjusted based on history of the memory consumption rate. Many embodiments also allow the rate of increasing the wait time to be different to the rate of decreasing the wait time.

DETAILED DESCRIPTION OF THE PREFERRED EMBODIMENT

The present invention is described to a large extent in this specification in terms of methods for allocating memory within the context of a virtual memory manager. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems compromised of processing units and arithmetic-logic circuits could to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, solid-state media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are orientated to software installed and executing on computer hardware, nevertheless, alternative embodiments implemented as firmware or as hardware are well within the scope of the present invention.

Exemplary methods, system, and computer program products for pacing memory in a multiprocessor computer system according to embodiments of the present invention are described with reference to the accompanying drawings.

Figure 1:
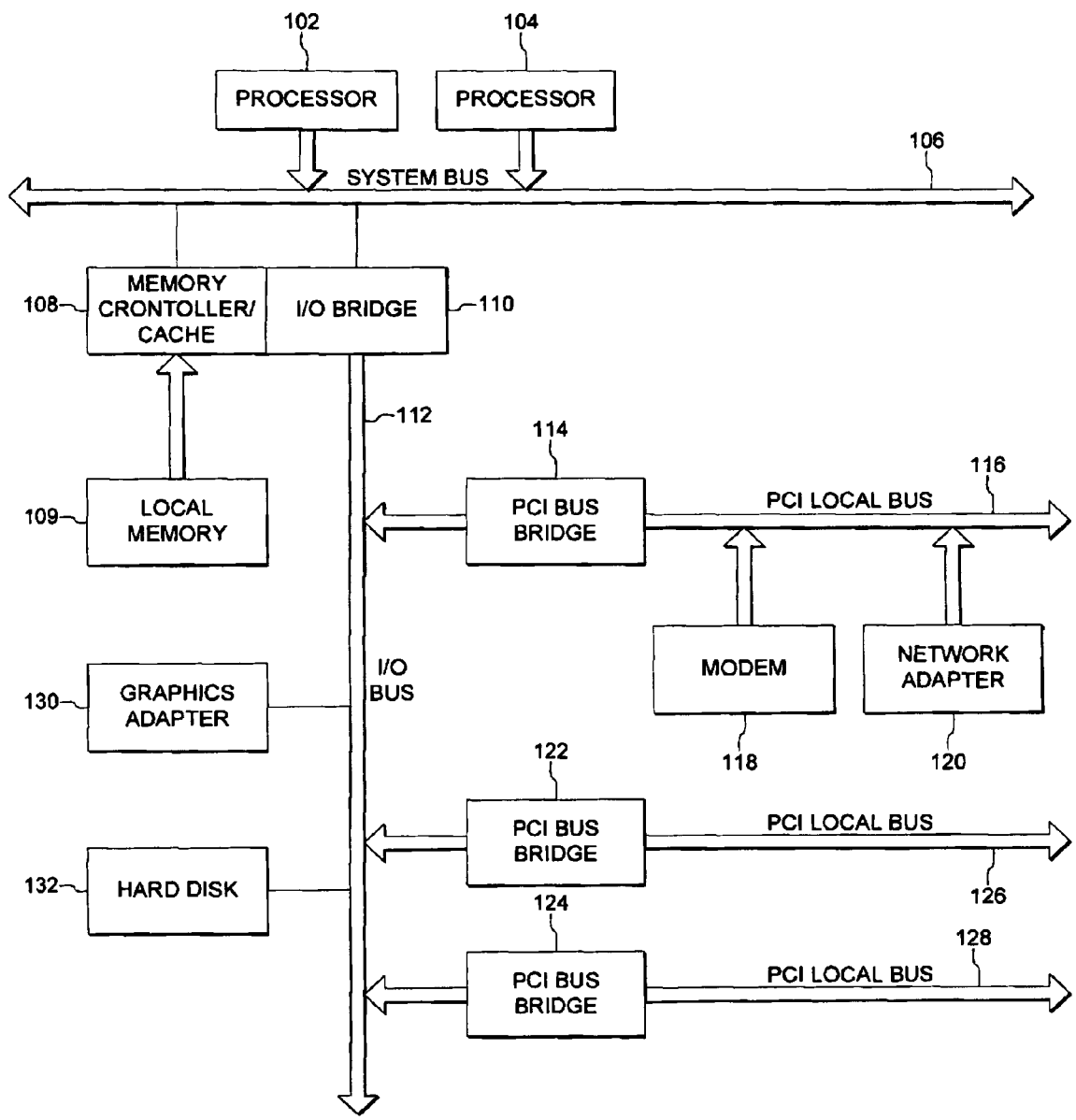
FIG. 1 sets forth a block diagram of an exemplary multiprocessor computer system capable of allocating memory in accordance with the present invention.

Referring to FIG. 1, a block diagram of a data processing system is depicted in accordance with a preferred embodiment of the present invention. Data processing system 100 may be a symmetric multiprocessor (SMP) system including a plurality of processors 102 and 104 connected to system bus 106. Also connected to system bus 106 is memory controller/cache 108, which provides an interface to local memory 109. I/O Bus Bridge 110 is connected to system bus 106 and provides an interface to I/O bus 112. Memory controller/cache 108 and I/O Bus Bridge 110 may be integrated as depicted.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communications links to clients may be provided through modem 118 and network adapter 120 connected to PCI local bus 116 through add-in connectors.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM eServer pSeries system, a product of International Business Machines Corporation in Armonk, N.Y., running the Advanced Interactive Executive (AIX) operating system or LINUX operating system. The local operating system is stored in local memory 109, which is often referred to as kernel memory.

An object oriented programming system such as Java may run in conjunction with the operating system and provide calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processors 102, 104.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1.

Figure 2:
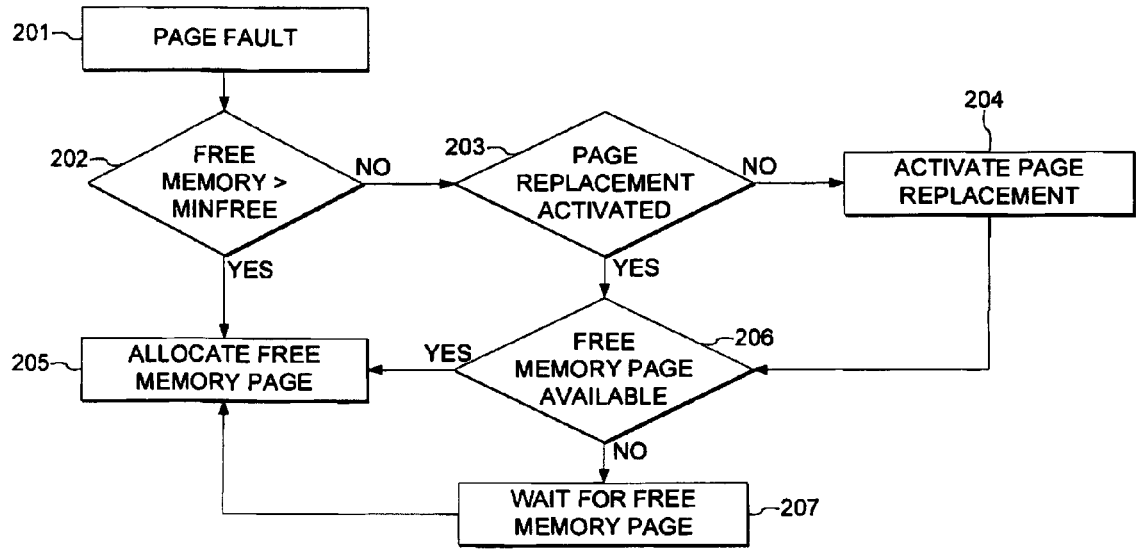
FIG. 2 sets forth a flow chart illustrating a exemplary method of satisfying a page allocation request.

FIG. 2 sets forth a flow chart illustrating a method of handling a page fault. When the page fault 201 occurs a check is made to determine how many free pages remain 202. If the number of free pages remaining are at or below a minfree threshold value used to indicate a shortage of free pages, a process to free pages is initiated. Following on from the decision to initiate the process of freeing memory pages, a check is performed to see if the process of freeing pages is currently active 203. If the process of finding and freeing pages is not active, it will be activated 204.

In the event that the number of free memory pages is at or below the memory threshold value for free pages 202 and the check to see if the process of freeing pages 203 has been made, a further check is performed to see if there are any free memory pages available 206. If there are no free memory pages available the system needs to wait for a free page to become available 207 before a page can be allocated 205.

In the event that a free page is available 206, or that the initial check that the number of free pages was greater than the threshold value to activate the process to free memory pages (202), a page from the list of free pages will be allocated 205 to satisfy the page fault 201.

Figure 3:
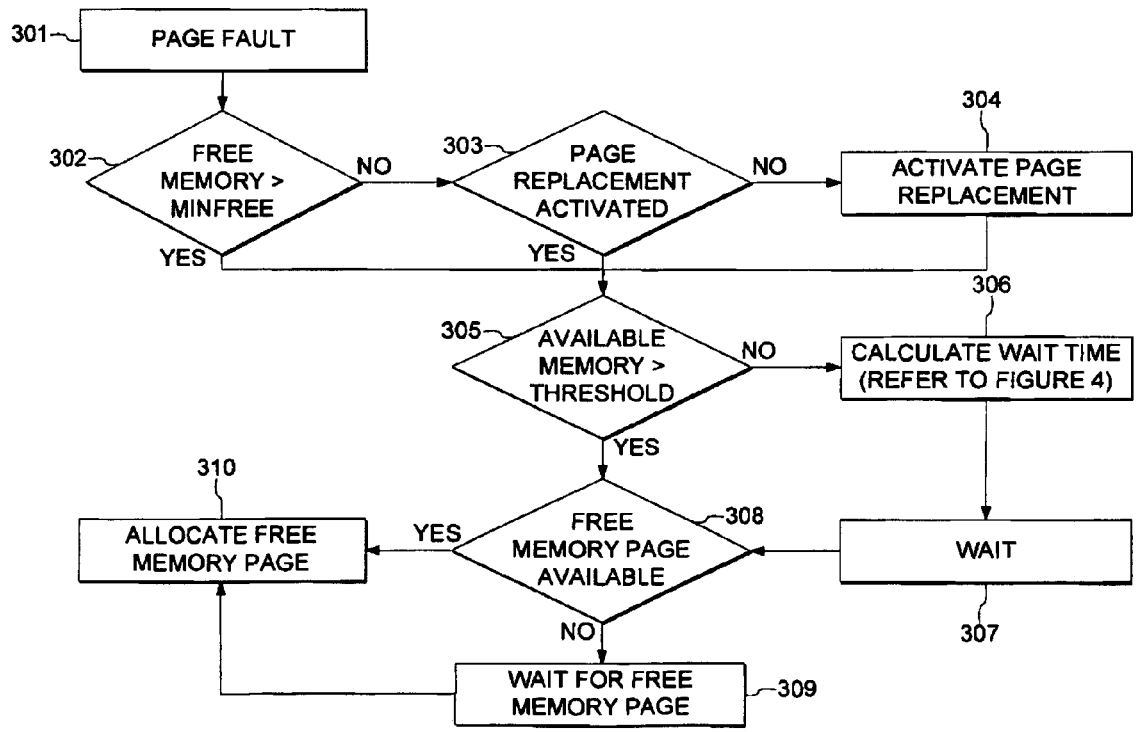
FIG. 3 sets forth a flow chart illustrating an exemplary method of satisfying a page allocation request using memory pacing.

FIG. 3 sets forth a flow chart illustrating a method of handling a page fault with the addition of memory pacing. When the page fault occurs 301 a check is made to determine how many free pages are remaining on the free page list 302. If it is determined that the number of free pages on the free page list is at or below the minfree threshold value, a check is made to determine if the process of freeing pages has been started 303. If the process of freeing memory pages has not been started 303, but needs to be started according to the check performed 302, the process of freeing pages is initiated 304.

With the checks done to confirm if the process to free pages is needed 302, 303, 304, a check is done to see if the number of pages on the free list is at or below the memory pacing value 305. This check is independent of the check to see if page replacement should be initiated 302. The number of free pages remaining before initiating memory pacing 305 could therefore be set at, or below the number of pages free remaining before initiating the process to free memory pages.

If the number of pages remaining on the free list is at or below the memory pacing threshold value 305 a memory pacing wait time is calculated 306. The thread waits for the period of time 307 which was calculated 306.

If the number of free pages remaining is above the memory pacing threshold value 305, or once the page fault handler has waited 307 the appropriate amount of time 306, a check is made to see if there are any free pages available to satisfy the page fault 308. If there are no free memory pages available 308, the page fault handler must wait for a page to become free 309. If there is a free memory page available 308, or the page fault handler has waited until a free page becomes available 309, the free memory page will be allocated 310.

Figure 4:
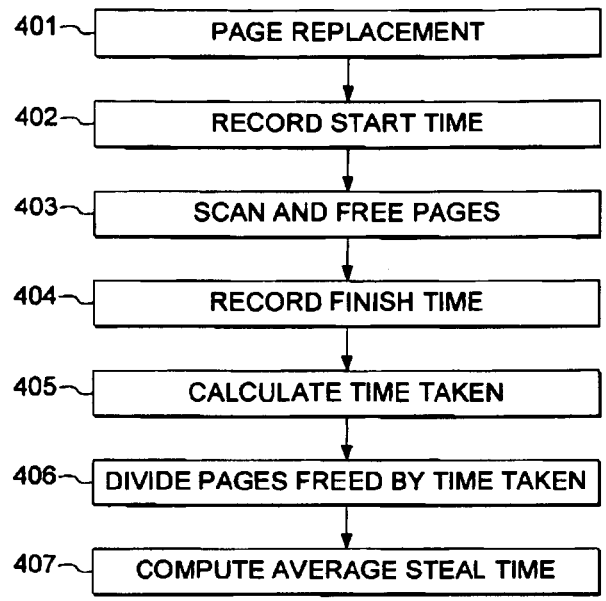
FIG. 4 sets forth a flow chart illustrating an exemplary method of tracking the page free rate when using memory pacing.

FIG. 4 sets forth a flow chart illustrating a method of tracking the amount of time, on average per page, that it takes to free a page once the page stealer has been activated.

When the page replacement process is started 401, the start time is recorded 402. As pages are freed during the scan and free phase of the page replacement process 403 a running count of the number of pages freed is kept. Once the page replacement process 401 has completed the completion time is recorded 404.

The page replacement process calculates the amount of time taken to complete it's work 405 by subtracting the recorded start time 402 from the recorded finish time 404. Dividing the time taken to steal pages 405 by the number of pages freed during the scan and free cycle 403 a per page steal time is calculated 406 for this page replacement cycle.

The per page steal time calculated 406 for this iteration of the page replacement processes is added to the sum of the previous page replacement cycles and divided by the total number of times the page replacement process has run to compute an average page steal time 407.

For simplification FIG. 4 shows the average steal time as a running average since the last system boot. It is possible to only keep this running average for the last 'n' iterations of the page stealer where 'n' could be a user tunable value. This would allow fine tuning of the page steal average bases weighted in favor of the current workload.

Figure 5:
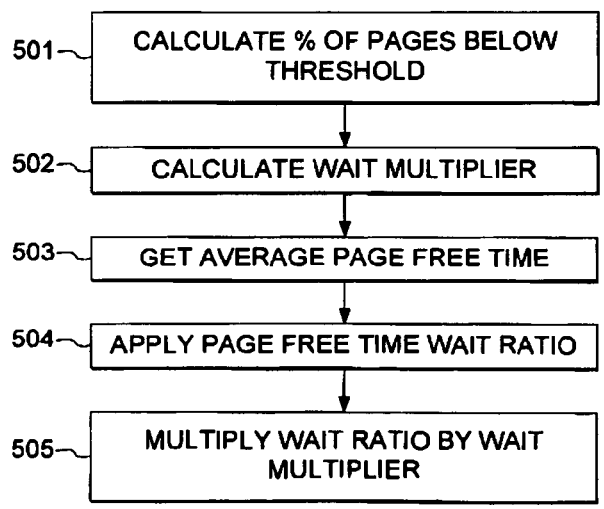
FIG. 5 sets forth a flow chart illustrating an exemplary method of calculating the page wait time for a page allocation request when using memory pacing.

FIG. 5 sets forth a flow chart illustrating a method of computing the memory pacing wait time when the number of free pages is at or below the memory pacing threshold value.

A calculation is performed to compute the percentage below the memory pacing threshold 501. For example, if the memory pacing threshold value is 100 pages, and the current number of available pages is 90, the percentage below the memory pacing threshold would be 10%.

A wait time multiplier is calculated 502 based on the percentage below the memory pacing value calculated 501. In this exemplary example, the percentage below the memory pacing value calculated 501 was multiplied by 0.1. The result of which was added to 1. Taking the example given where the memory pacing threshold is 100 pages, and the number of pages available is 90, the calculated percentage below the memory pacing threshold is 10. This value 10 multiplied by 0.1 equals 1, which when added to 1 equals 2. The value 2 then becomes the calculated wait multiplier 502.

The average page steal time (FIG. 4) is retrieved 503. The average page steal time is multiplied by a user defined parameter which applies a weighting to the average page steal time. For example if this value is 50%, the calculated page free weight value will be 50% of the currently computed average page steal time as calculated in FIG. 4. The wait multiplier calculated 502 is multiplied by the weighted page free time 504 to calculate the wait time 505.

Figures 6, 7:
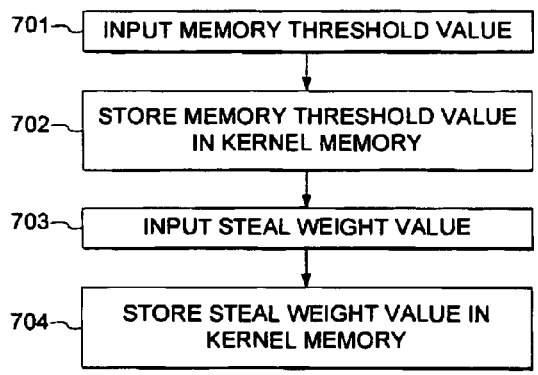
FIG. 6 sets forth a table illustrating an exemplary method of calculating the page wait time for a page allocation request when using memory pacing.
FIG. 7 sets forth a flow chart illustrating an exemplary method to input the user defined memory threshold and steal weight values, and to store these within the kernel when using memory pacing.

FIG. 6 sets forth an example table for illustrative purposes depicting the steps to calculate the memory pacing delay value. For illustrative purposes the user defined threshold value is assumed to be 100, the user defined steal weight is assumed to be 50%, and the average page steal time is assumed to be 2 us. In this example, when the available free pages 601 is 90, the percentage below the memory pacing value 602 is 10%, and the weight multiplier 603 is calculated to be 2 (10% below the threshold value, multiplied by 0.1 plus 1 equals 2). In this example the average page steal time is 2 us and the user defined weighting parameter is 50%, which gives a calculated steal weight 604 of 1 (50% of 2 us). The computed wait time 605 will be 1 us (weighted per-page steal time 604) multiplied by 2 (wait multiplier 603) which equals 2 us. As shown in FIG. 6, the wait time 605 increases as the amount of free pages 601 decreases. To achieve this, the weight multiplier 603 is designed to increase as the number of free pages decreases. The adjusted steal time 604 is used to adjust the sensitivity of memory pacing algorithm. This is achieved by adjusting the calculated average steal time to allow the delay to be less than the actual calculated page steal time.

FIG. 7 sets forth a flow chart illustrating a method to input the user defined parameters for memory threshold and steal weight which are store in the kernel for purposes of calculating the memory pacing delay.

The user is prompted to input a memory threshold value 701 which is stored in a kernel memory location 702. The user is then prompted to provide a steal weight percentage 703 which is stored in a kernel memory location 704.

As described above, to minimize the occurrence of the scenario where a system generates page requests at a faster rate than can be handled without depleting the free pages from the free list, the time that it takes to satisfy a page request can be extended. This process of adding a wait time before allocating a free memory page in response to a page request is referred to herein as memory pacing. Memory pacing is initiated when the available pages on the free list falls below a threshold value. This threshold value can be set at a different value than that used for determining whether a page replacement process, in general, needs to be initiated. In other words, if the number of unallocated pages on a free list falls below a first threshold value, a page replacement policy may be initiated. Then if the number of unallocated pages on the free list falls yet further below a second threshold value, memory pacing may be initiated along with the initiated page replacement policy. In other embodiments, these threshold values may indeed be the same. As the number of pages on the free list continues to drop, the wait time will be further extended by an increasing amount. For example, the wait time can be doubled every time the number of memory free pages is halved. Likewise, as the number of free pages increases, but while still below the threshold value, the wait time can be decreased. As such, the wait time is inversely proportional to the percentage of free memory. Once the number of free pages has recovered above the threshold value, a wait time will no longer be taken into consideration before allocating a free page from the free list. In this way, page requests can be satisfied from the free list at a dynamically adjusting rate so that the free pages in the free list will not become depleted. This avoids encountering longer page fault processing that would otherwise be needed for page replacement when no free pages are available.

It is important to note that while the present invention has been described in the context of a fully functioning data processing system, those of ordinary skill in the art will appreciate that the processes of the present invention are capable of being distributed in the form of a computer readable medium of instructions in a variety of forms, and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing memory page requests in a multi-processor data processing system, comprising:
   determining a threshold value of available memory;
   responsive to the available memory being below the threshold value of available memory, dynamically adjusting an allocation time to fulfill a page request, wherein dynamically adjusting the allocation time comprises:
      calculating an allocation wait time using a weighted page free time, wherein the allocation wait time is a delay before allocating a page in response to a page request;
      determining an average time to steal a page, wherein the average time includes a time for performing a scan for selectable pages by a page stealer; and
      applying a tunable value to the average time to determine the allocation wait time; and
   responsive to an expiration of the allocation wait time, allocating the page in response to the page request.

2. The method of claim 1, wherein applying the tunable value to the average time to determine the allocation wait time further comprises:
   applying the tunable value to the average time to increase the allocation wait time as the available memory decreases; and
   applying the tunable value to the average time to decrease the allocation wait time as available memory increases.

3. A computer implemented method for managing memory page requests in a multi-processor data processing system, the computer implemented method comprising:
   calculating a wait time multiplier based upon a percentage below a memory pacing threshold;
   calculating a weighted page free time using an average page steal time and a user defined parameter;
   calculating a wait time from the wait time multiplier and the weighted page free time; and
   postponing allocation of pages in memory according to the wait time.

* * * * *